(12) United States Patent
Kanehara et al.

(10) Patent No.: US 8,062,159 B2
(45) Date of Patent: Nov. 22, 2011

(54) METAL RING FOR METAL BELT

(75) Inventors: Shigeru Kanehara, Saitama (JP); Toru Yagasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 686 days.

(21) Appl. No.: 11/293,512

(22) Filed: Dec. 5, 2005

(65) Prior Publication Data

US 2008/0009378 A1    Jan. 10, 2008

(30) Foreign Application Priority Data

Dec. 8, 2004  (JP) ................. 2004-355260

(51) Int. Cl.
| F16G 1/00 | (2006.01) |
| F16G 5/00 | (2006.01) |
| F16G 1/21 | (2006.01) |
| F16G 1/22 | (2006.01) |
| F16G 5/16 | (2006.01) |
| F16H 55/56 | (2006.01) |
| B23Q 17/00 | (2006.01) |
| B23P 11/02 | (2006.01) |

(52) U.S. Cl. ......... 474/201; 474/242; 474/8; 29/407.05; 29/407.08; 29/446

(58) Field of Classification Search ............... 29/407.05, 29/407.08, 446; 474/242, 201, 8
See application file for complete search history.

(56) References Cited

U.S. PATENT DOCUMENTS

| 2,722,132 | A | * | 11/1955 | Russell | 474/113 |
| 3,765,258 | A | * | 10/1973 | Jespersen | 474/164 |
| 4,056,679 | A | * | 11/1977 | Brandt et al. | 174/13 |
| 4,589,859 | A | * | 5/1986 | Kanesaka | 474/148 |
| 4,653,675 | A | * | 3/1987 | Ratzky | 222/390 |
| 4,717,288 | A | * | 1/1988 | Finn et al. | 405/202 |
| 4,823,608 | A | | 4/1989 | Satoh | |
| 5,152,047 | A | * | 10/1992 | Kojima et al. | 29/411 |
| 6,238,313 | B1 | * | 5/2001 | Smeets et al. | 474/244 |
| 6,342,020 | B1 | * | 1/2002 | Aoyama | 474/242 |
| 6,517,458 | B2 | * | 2/2003 | Kanehara | 474/245 |
| 6,705,963 | B2 | * | 3/2004 | Smeets et al. | 474/242 |
| 6,708,383 | B2 | * | 3/2004 | Arikawa et al. | 29/407.05 |
| 6,763,602 | B2 | * | 7/2004 | Arikawa et al. | 33/701 |
| 6,942,590 | B2 | * | 9/2005 | Okuno et al. | 474/242 |
| 2002/0025873 | A1 | * | 2/2002 | Akagi et al. | 474/242 |
| 2002/0137585 | A1 | * | 9/2002 | Smeets et al. | 474/242 |

(Continued)

FOREIGN PATENT DOCUMENTS

| EP | 0 283 303 A2 | 9/1988 |
| EP | 1 055 738 A | 11/2000 |
| EP | 1 304 503 A2 | 4/2007 |
| JP | 7-110390 B2 | 11/1995 |

(Continued)

*Primary Examiner* — Michael Mansen
*Assistant Examiner* — Henry Liu
(74) *Attorney, Agent, or Firm* — Arent Fox, LLP

(57) ABSTRACT

In a metal ring for a metal belt of a belt type continuously variable transmission, a relationship is established between a compressive residual stress of a metal ring of an innermost layer imparted by a nitriding treatment and a free state radius of the metal ring nondimensionalized by a minimum winding radius. In the relationship, the sum of a compressive residual stress acting on the inner peripheral face of the metal ring, a compressive stress due to flexure and a contact stress does not exceed the elastic deformation limit of the metal ring. The maximum compressive stress of the metal ring does not become excessive, and an abrasion resistance of the surfaces of the metal ring is guaranteed.

8 Claims, 15 Drawing Sheets

U.S. PATENT DOCUMENTS

| | | | |
|---|---|---|---|
| 2003/0004025 A1* | 1/2003 | Okuno et al. | 474/260 |
| 2003/0084583 A1* | 5/2003 | Arikawa et al. | 33/555.1 |
| 2004/0053723 A1* | 3/2004 | Smeets | 474/242 |
| 2004/0082417 A1* | 4/2004 | Smeets et al. | 474/242 |

FOREIGN PATENT DOCUMENTS

| | | |
|---|---|---|
| JP | 2003-105443 A | 4/2003 |
| JP | 2003-126933 | 5/2003 |
| JP | 2004-257462 A | 9/2004 |

* cited by examiner

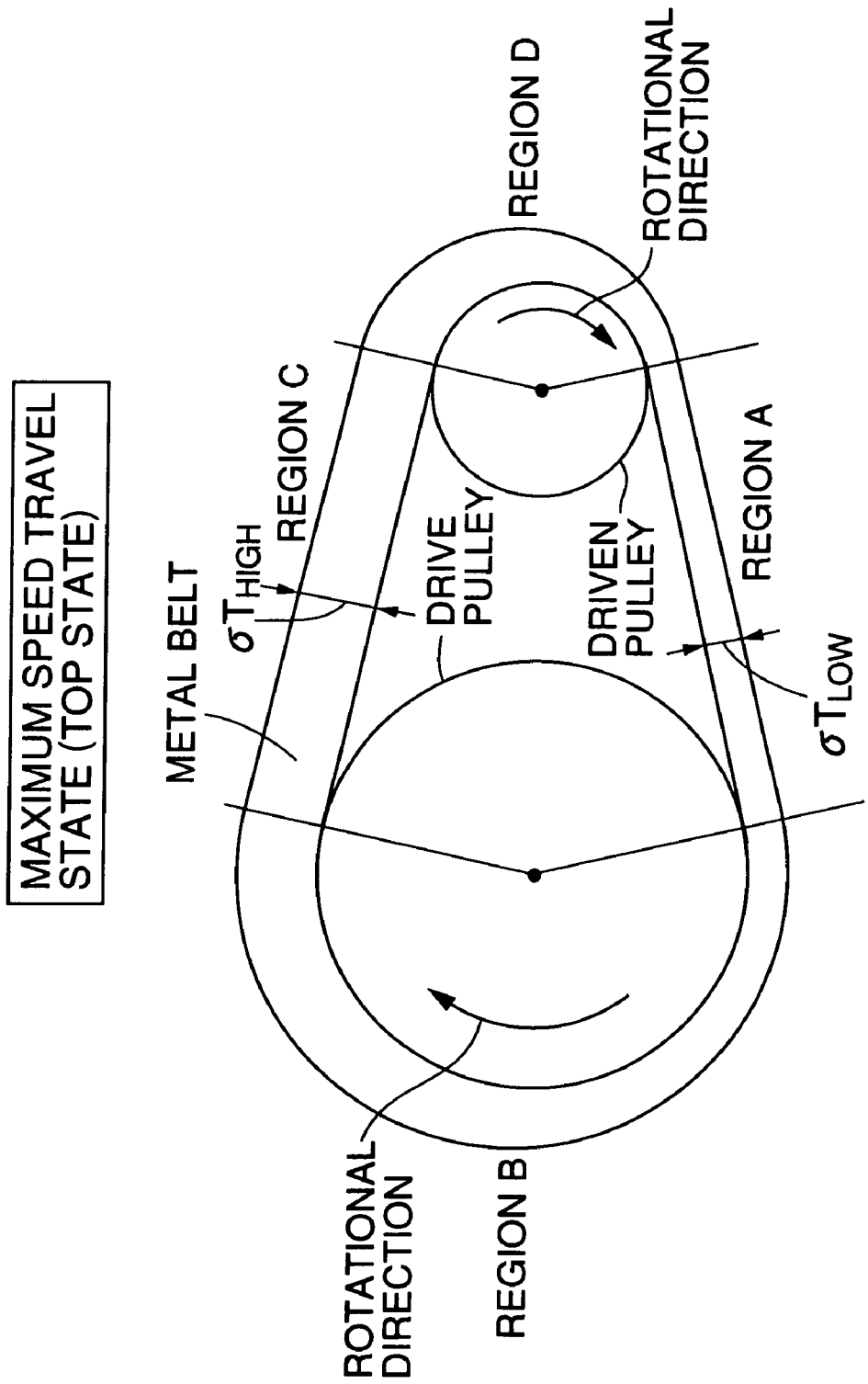

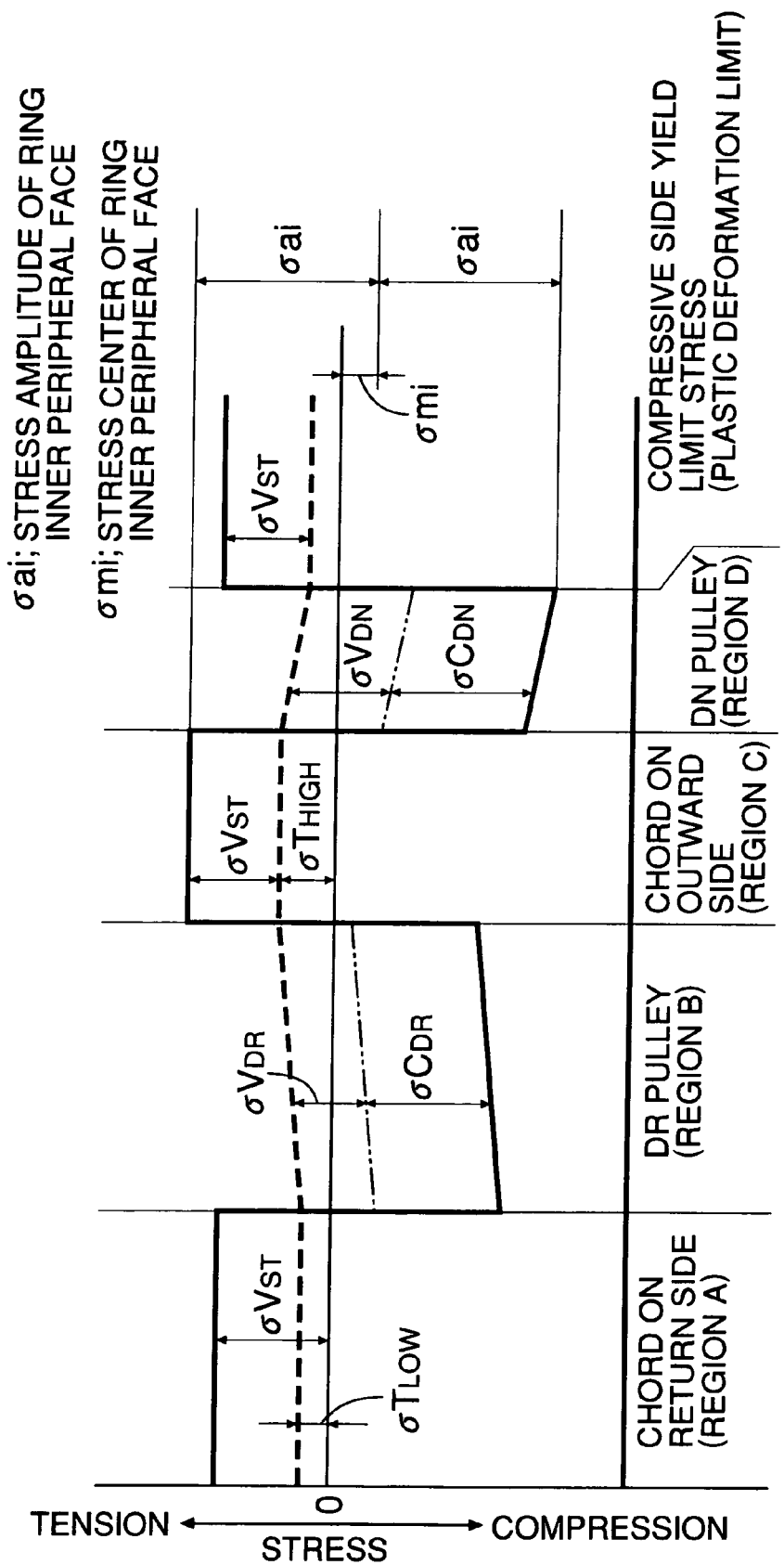

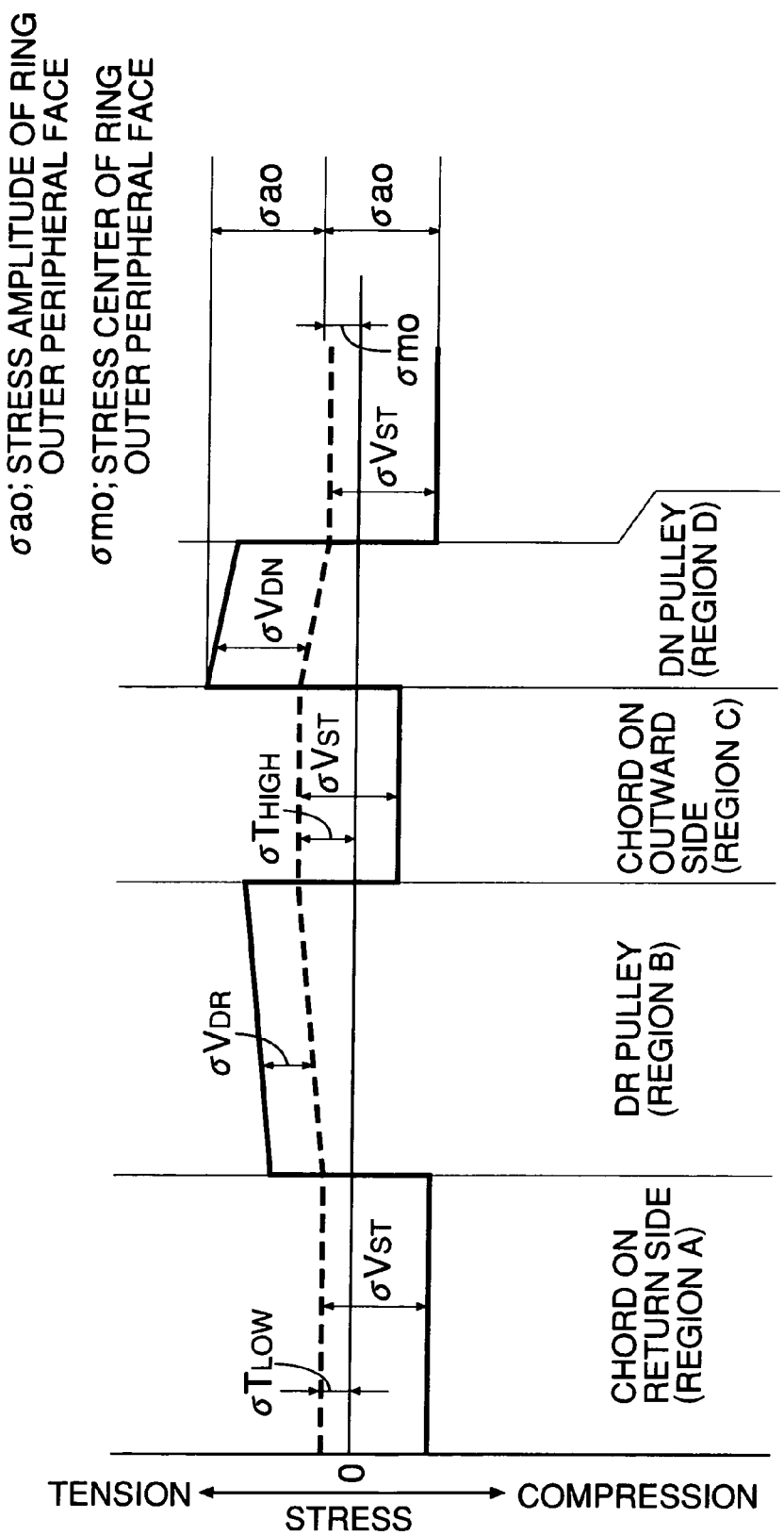

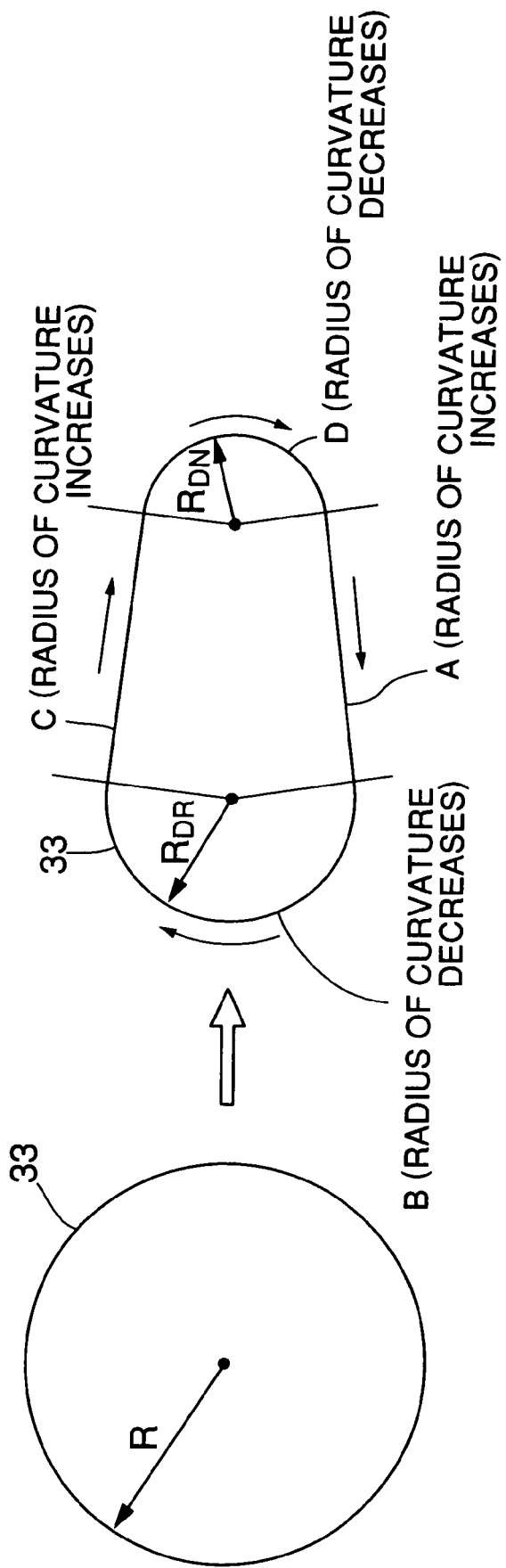

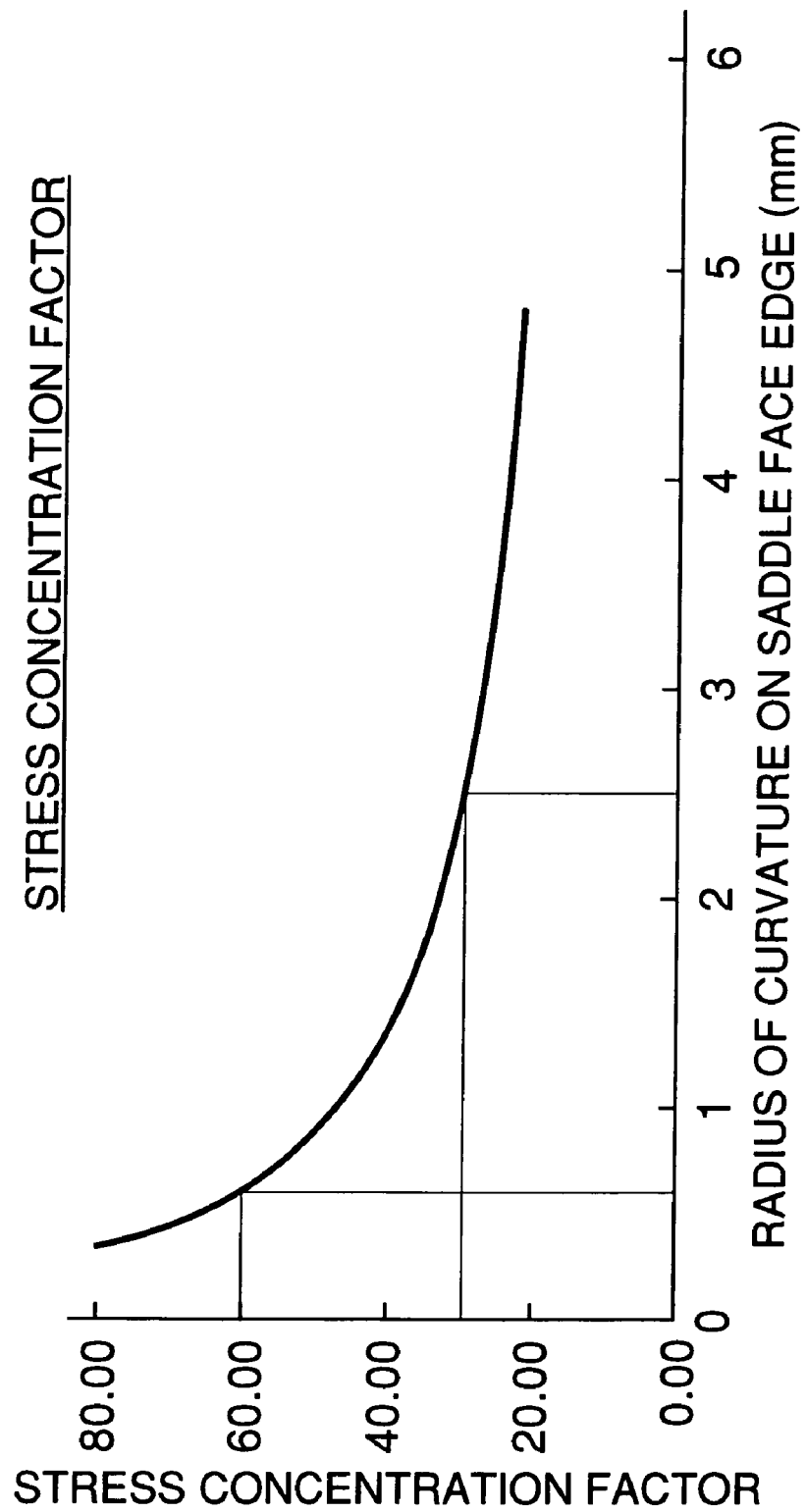

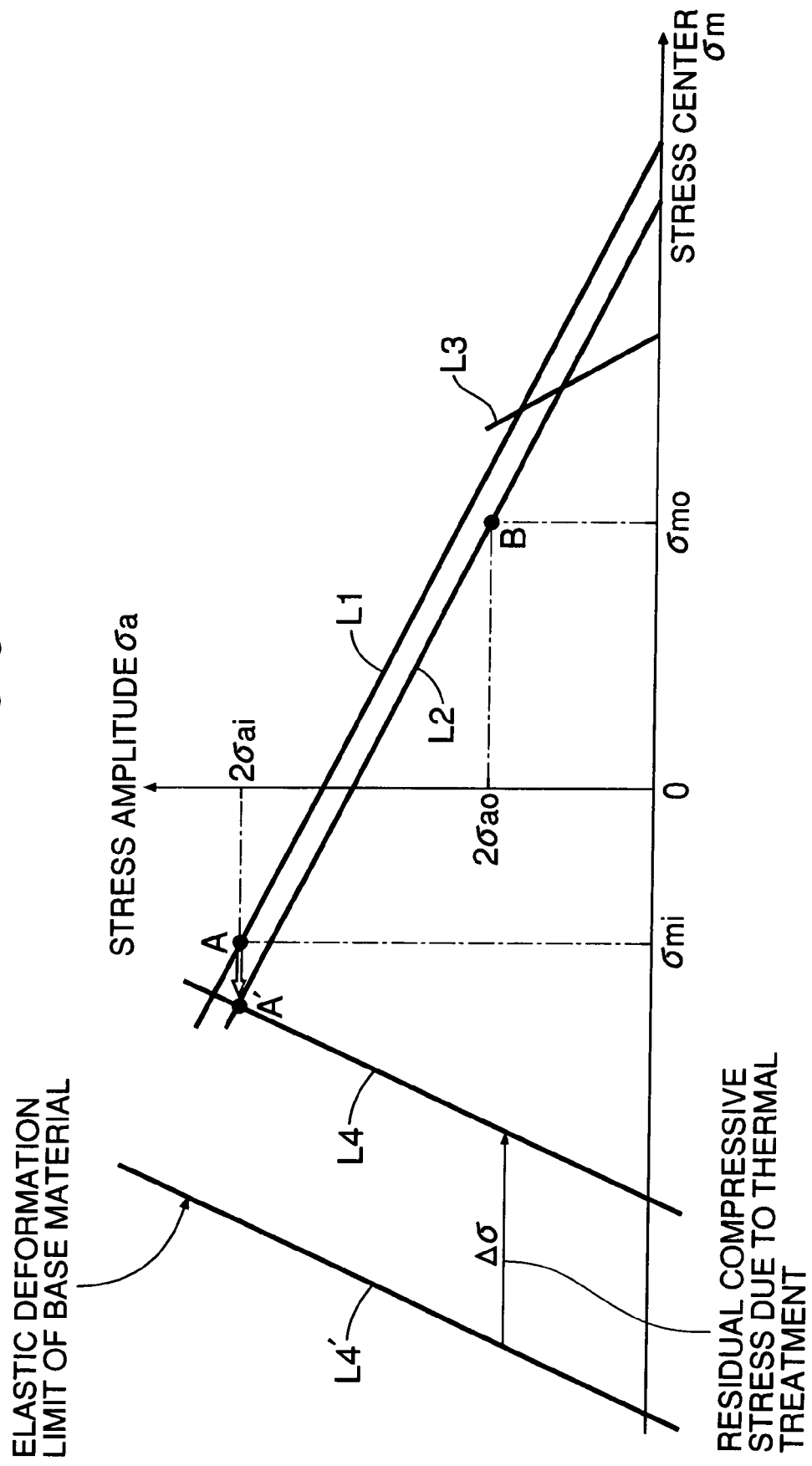

FREE STATE RADIUS $R_0$

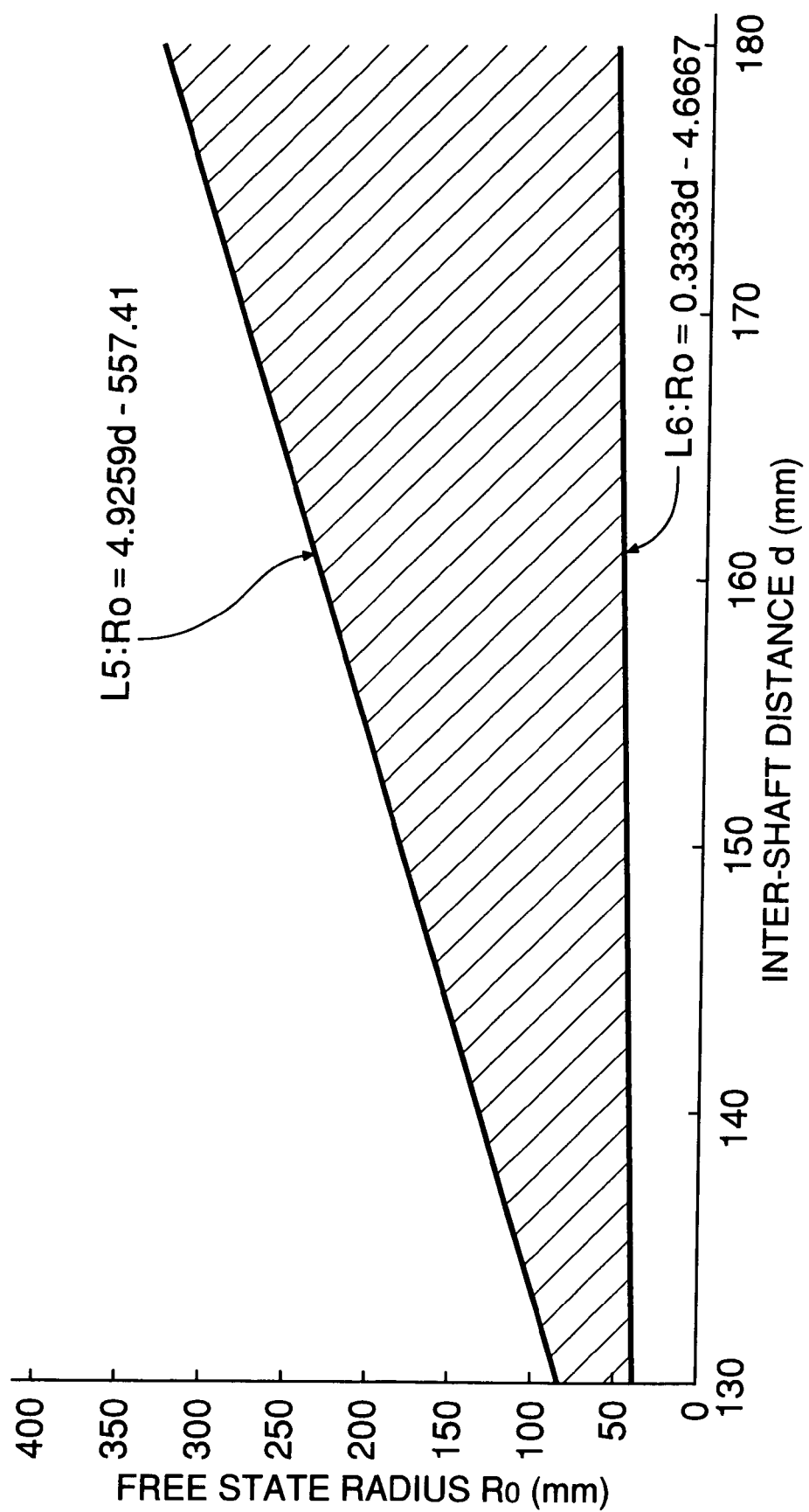

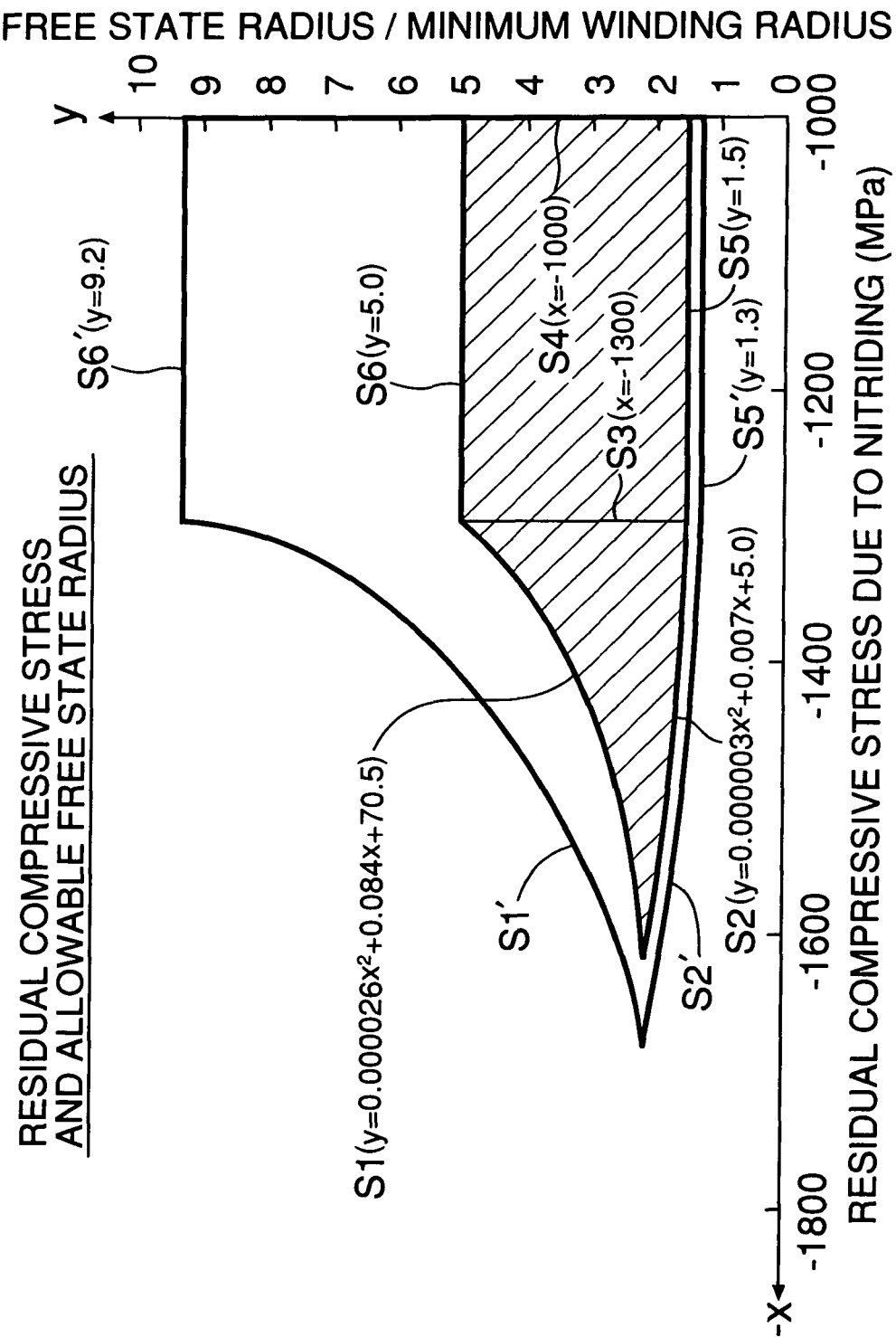

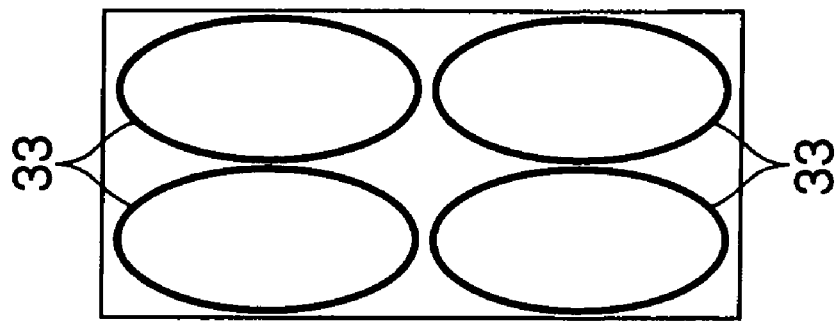
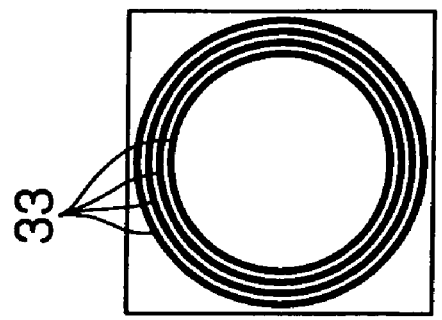
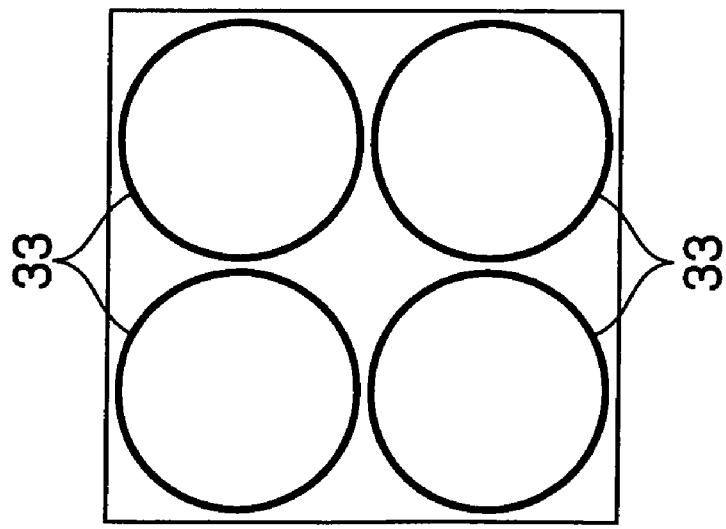

METAL RING FOR METAL BELT

RELATED APPLICATION DATA

The present invention is based upon Japanese priority application No. 2004-355260, which is hereby incorporated in its entirety herein by reference.

BACKGROUND OF THE INVENTION

1. Field of the Invention

The present invention relates to a metal ring of a metal belt used in a belt type continuously variable transmission, wherein a free state radius of the metal ring, when cut, is set to increase the fatigue life of the metal ring.

2. Description of the Related Art

A metal belt used in a belt type continuously variable transmission includes a metal ring assembly formed by layering a plurality of metal rings on top of each other, and a plurality of metal elements supported along the metal ring assembly. Tensile stress and compressive stress due to flexure, as well as tensile stress due to tension, act on each metal ring. Specifically, in a wound section wherein the metal ring is wound around a pulley, an outer peripheral face of the metal ring is pulled, and a tensile stress acts thereon. At the same time, an inner peripheral face of the metal ring is compressed, and a compressive stress acts thereon. In a chord section where the metal ring is separated from the pulley, the outer peripheral face of the metal ring is compressed, and a compressive stress acts thereon. At the same time, the inner peripheral face thereof is pulled, and a tensile stress acts thereon. In this way, the stress acting on the inner and the outer peripheral faces periodically varies with the rotation of the metal ring such that the fatigue life of the metal ring deteriorates.

Japanese Patent Application Laid-open No. 2003-126933 discloses an arrangement in which a free state radius Ro of the metal ring is set so that, in a TOP ratio state in which the metal ring receives the most severe load, a corrected stress amplitude $\sigma_{ao}'$ (a stress amplitude $\sigma_{ao}$ when a stress center $\sigma_{mo}=0$) on the outer peripheral face of the metal ring, calculated from the stress amplitude $\sigma_{ao}$ and the stress center $\sigma_{mo}$ on the outer peripheral face, coincides with a corrected stress amplitude $\sigma_{ai}'$ (a stress amplitude $\sigma_{ai}$ when a stress center $\sigma_{mi}=0$) on the inner peripheral face of the metal ring calculated from the stress amplitude $\sigma_{ai}$ and the stress center $\sigma_{mi}$ of the inner peripheral face.

The inner peripheral face of the metal ring, that is, the innermost layer of the plurality of stacked metal rings, abuts a saddle face of a metal element, which is a transverse element of the metal belt. Accordingly, the maximum compressive stress on the inner peripheral face of the metal ring increases by an amount corresponding to a compressive stress (contact stress) acting on the abutment section. Therefore, during operation of the belt type continuously variable transmission, if the sum of a residual compressive stress of the metal ring due to a nitriding treatment, a compressive stress due to flexure, and a contact stress due to contact of the metal element with the saddle face becomes excessive and exceeds an elastic deformation limit, the metal ring plastically deforms and becomes vulnerable to breaking. The arrangement disclosed in Japanese Patent Application Laid-open No. 2003-126933 does not take into account either the contact stress due to contact with the saddle face acting on the inner peripheral face of the metal ring of the innermost layer, or the relationship between the maximum compressive stress and the elastic deformation limit of the metal ring, leading to a possibility that the life of the metal ring might not be increased as desired.

SUMMARY OF THE INVENTION

The present invention has been achieved in view of the above-mentioned circumstances, and it is an aspect thereof to maximize the life of a metal ring of a metal belt by setting an appropriate free state radius for the metal ring.

In order to achieve the above-mentioned aspect and according to a first feature of the invention, there is provided a metal ring of a metal belt used in a belt type continuously variable transmission, wherein a free state radius of the metal ring, when cut, is set to increase the fatigue life of the metal ring. The free state radius of the metal ring is set wherein a stress amplitude and a stress center for each of an outer peripheral face and an inner peripheral face of the metal ring do not exceed an elastic deformation limit of the metal ring. The stress amplitude and the stress center are determined from a variation in stress of the outer peripheral face and the inner peripheral face of the metal ring during operation of the belt type continuously variable transmission.

With the first feature, the stress amplitude and the stress center for each of the outer peripheral face and the inner peripheral face of the metal ring are calculated, and the free state radius of the metal ring is set wherein the compressive stress of the metal ring does not exceed the elastic deformation limit. Therefore, it is possible to prevent the compressive stress from becoming excessive and exceeding the elastic deformation limit, thus reliably increasing the life of the metal ring.

According to a second feature of the invention, there is provided a metal ring of a metal belt used in a belt type continuously variable transmission, wherein a free state radius of the metal ring, when cut, is set to increase the fatigue life of the metal ring. The free state radius of the metal ring is set wherein a stress amplitude and a stress center for each of an outer peripheral face and an inner peripheral face of the metal ring do not exceed an elastic deformation limit of the metal ring obtained by adding a residual compressive stress due to a thermal treatment to an elastic deformation limit of a base material. The stress amplitude and the stress center are determined from a variation in stress of the outer and inner peripheral faces of the metal ring during operation of the belt type continuously variable transmission while taking into consideration a contact stress that occurs when the metal ring contacts the transverse element.

With the second feature, the stress amplitude and the stress center for each of the outer peripheral face and the inner peripheral face of the metal ring are calculated while taking into consideration the contact stress that occurs when the metal ring contacts the transverse element. Also, the free state radius of the metal ring is set wherein the compressive stress of the metal ring does not exceed the elastic deformation limit obtained by adding the residual compressive stress due to thermal treatment to the elastic deformation limit of the base material. Therefore, the compressive stress is effectively prevented from becoming excessive and exceeding the elastic deformation limit, thus reliably increasing the life of the metal ring.

According to a third feature of the present invention, when x (MPa) denotes the residual compressive stress of the metal ring due to the thermal treatment, d denotes an inter-shaft distance, and Ro denotes the free state radius, the following expressions are simultaneously valid: $-1300 \leq x < -1000$; $Ro < 4.93d - 557.4$; and $Ro < 0.33d - 4.7$. With the third feature, the total compressive stress of the metal ring does not exceed the elastic deformation limit over the entire inter-shaft distance, and a minimum necessary abrasion resistance due to the residual compressive stress is provided for the metal ring.

According to a fourth feature of the present invention, when y denotes the free state radius/minimum winding radius of the metal ring and x (MPa) denotes the residual compressive stress of the metal ring due to a thermal treatment, the following expressions are simultaneously valid: $x<-1300$; $y<0.000026x^2+0.084x+70.5$; and $y>0.000003x^2+0.007x+5.0$. With the fourth feature, the total compressive stress of the metal ring does not exceed the elastic deformation limit, and a sufficient abrasion resistance due to the residual compressive stress is provided for the metal ring.

According to a fifth feature of the present invention, when y denotes the free state radius/minimum winding radius of the metal ring and x (MPa) denotes the residual compressive stress of the metal ring due to the thermal treatment, the following expressions are simultaneously valid: $X<-1300$; $y<0.000026x^2+0.084x+70.5$; and $y>0.000003x^2+0.007x+5.0$; or $y<5.0$; $y>1.5$; and $-1300\leq x<-1000$. With the fifth feature, in addition to the operational effect by the second feature, excessive compressive stress of the metal ring accompanying running is avoided, while providing a minimum necessary abrasion resistance for the metal ring due to the residual compressive stress.

According to a sixth feature of the present invention, setting the free state radius of the metal ring is carried out by correcting the circumferential length of the metal ring; an age-hardening treatment is carried out in a perfect circle state after correcting the circumferential length; and a nitriding treatment in an elliptical state after the age-hardening treatment is carried out.

With the sixth feature, the age-hardening treatment is carried out in the perfect circle state of the metal rings after setting the free state radius by correcting the circumferential length of the metal ring. Therefore, the age-hardening treatment is carried out without changing the free state radius which is uniformly imparted by correcting the circumferential length. Further, the nitriding treatment, which does not affect the free state radius of the metal ring, is carried out in the elliptical state of the metal ring, thereby reducing the space needed to perform the nitriding treatment.

According to a seventh feature of the present invention, the age-hardening treatment is carried out while concentrically arranging a plurality of the metal rings that are not in contact with each other when being used. With the seventh feature, when carrying out an age-hardening treatment with the metal ring in a perfect circle, the plurality of metal rings that are not in contact with each other when being used are arranged concentrically. Therefore, the space needed for carrying out the age-hardening treatment, while preventing the plurality of metal rings from interfering with each other, is reduced.

A metal element 32 of an embodiment described below corresponds to the transverse element of the present invention, and a compression side elastic limit line L4 of the embodiment corresponds to the elastic deformation limit of the present invention.

The above-mentioned aspect, other aspects, characteristics, and advantages of the present invention will become apparent from an explanation of a preferred embodiment that will be described in detail below by reference to the attached drawings.

BRIEF DESCRIPTION OF THE DRAWINGS

FIG. 3 is a diagram illustrating the action of tensile stress on a metal ring of the metal belt illustrated in FIG. 2;

FIG. 4 is a graph illustrating changes in the stress acting on the inner peripheral face of the metal ring;

FIG. 5 is a graph illustrating changes in the stress acting on the outer peripheral face of the metal ring;

FIGS. 6A and 6B are diagrams explaining the shape of the metal ring in a non-used or endless state and in a used state;

FIG. 7 is a graph illustrating the relationship between a stress concentration factor and a radius of curvature of the edge of a saddle face portion of the metal belt;

FIG. 8 is a graph illustrating equal life lines of the metal ring;

FIG. 10 is a graph illustrating an acceptable region for an inter-shaft distance and the free state radius;

FIG. 11 is a graph illustrating an acceptable region for residual compressive stress and nondimensionalized free state radius;

FIGS. 14A-C are diagrams explaining methods for an age-hardening treatment and a nitriding treatment of the metal ring.

DETAILED DESCRIPTION OF THE PREFERRED EMBODIMENT

Figure 2:
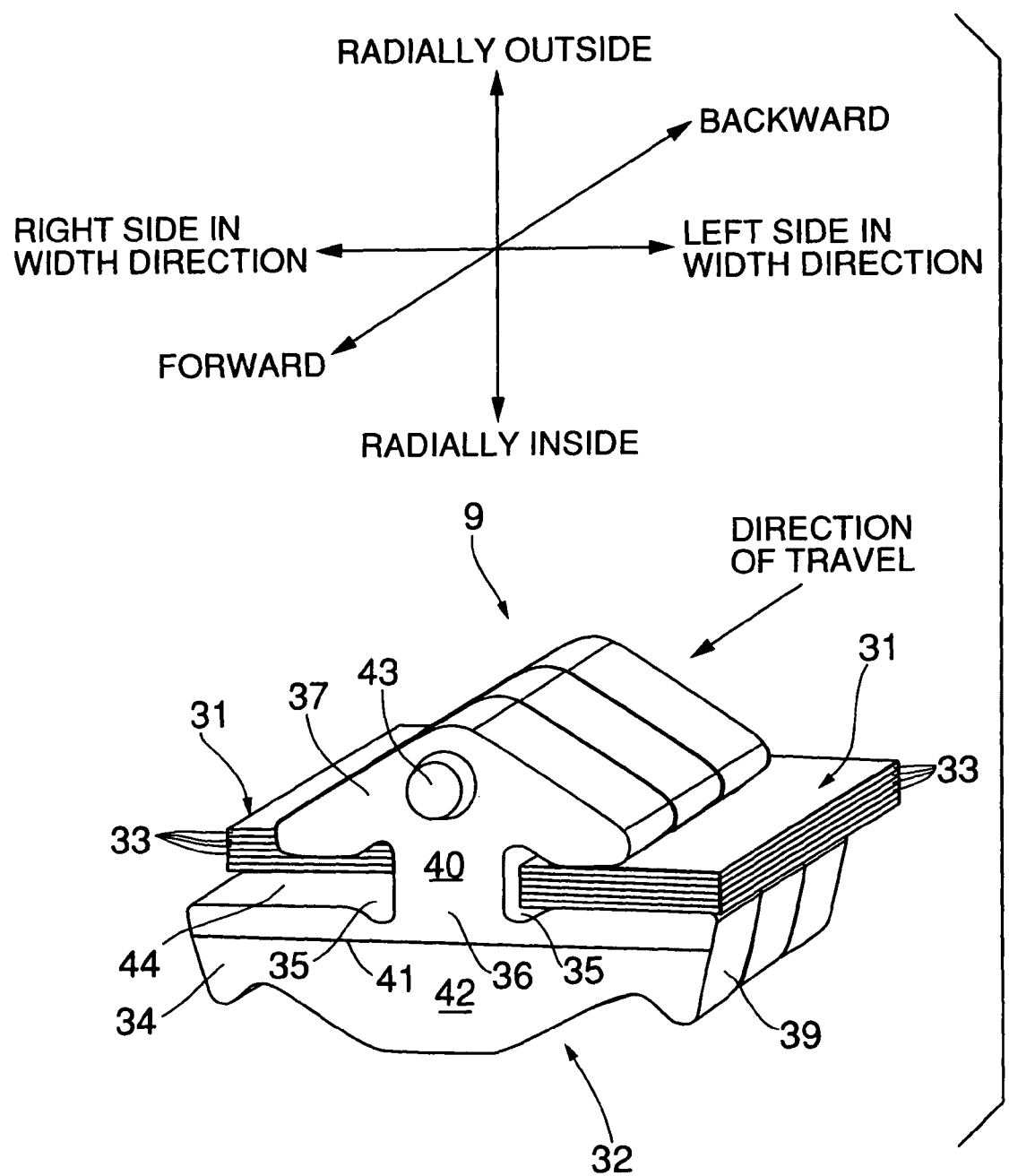
FIG. 2 is a perspective view of a metal belt used in the transmission of FIG. 1.

Definitions of a fore-and-aft direction, a width direction, and a radial direction of a metal element or a metal ring used in the embodiment are as shown in FIG. 2. The radial direction is defined as the radial direction of a pulley against which the metal element abuts, the side closer to the shaft of the pulley being radially inside, and the side further or more remote from the shaft of the pulley being radially outside. The width direction is defined as a direction along the shaft of the pulley against which the metal element abuts, and the fore-and-aft direction is defined as a direction along the direction of travel of the metal element when a vehicle travels forward.

Figure 1:
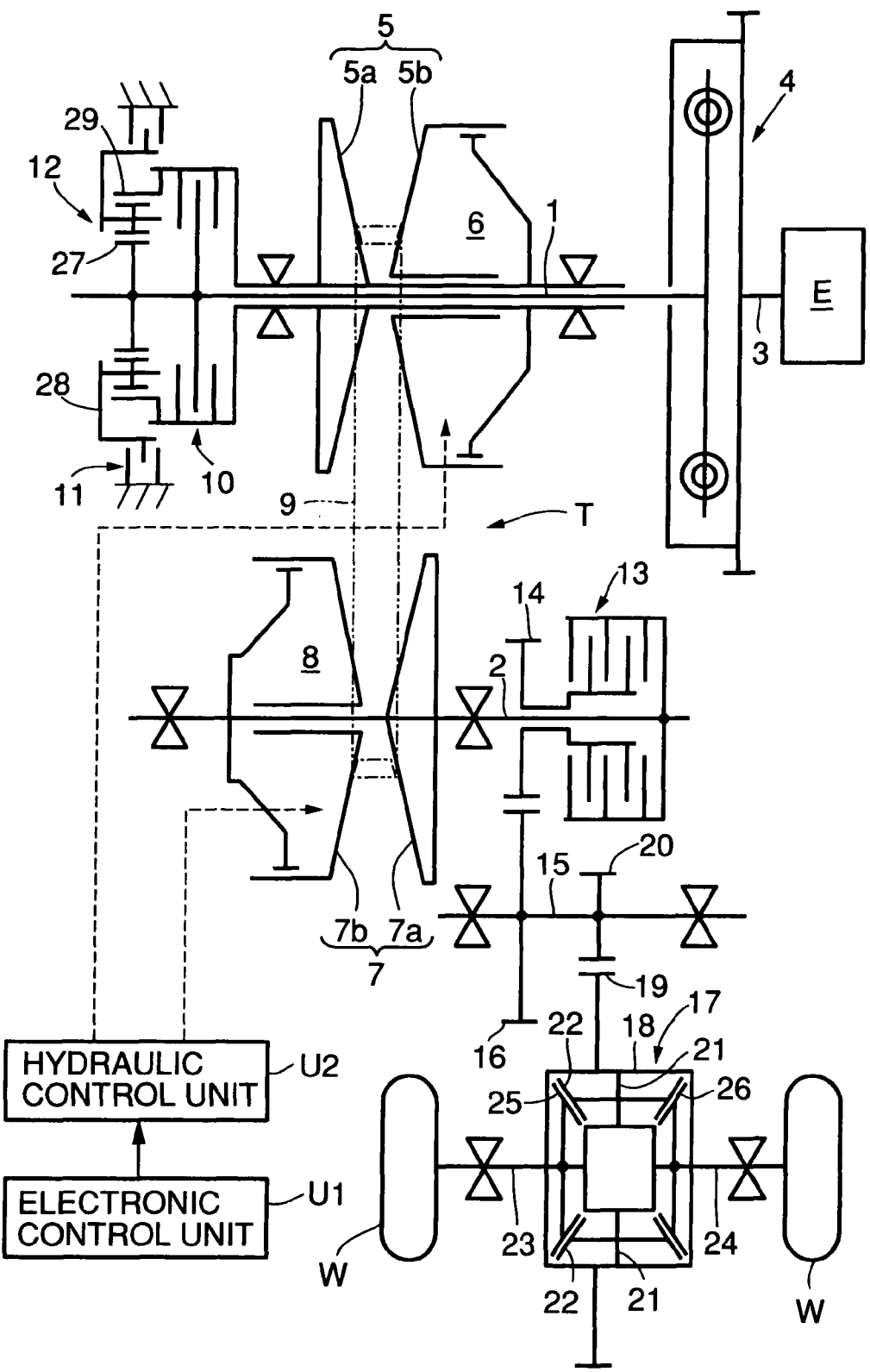
FIG. 1 is a schematic diagram of a power transmission system of a vehicle equipped with a belt type continuously variable transmission according to a preferred embodiment of the present invention.

As shown in FIG. 1, a vehicular belt type continuously variable transmission T includes a drive shaft 1 and a driven shaft 2 disposed in parallel relative to each other. The left end of a crank shaft 3 of an engine E is connected to the right end of the drive shaft 1 via a damper 4.

A drive pulley 5 supported on the drive shaft 1 includes a fixed pulley half 5a that is rotatable relative to the drive shaft 1 and a movable pulley half 5b that is axially slidable relative to the fixed pulley half 5a. The channel width between the movable pulley half 5b and the fixed pulley half 5a is varied by hydraulic pressure acting on a hydraulic chamber 6. A driven pulley 7 supported on the driven shaft 2 includes a fixed pulley half 7a integrally formed with the driven shaft 2 and a movable pulley half 7b that is axially slidable relative to the fixed pulley half 7a. The channel width between the movable pulley half 7b and the fixed pulley half 7a is varied by hydraulic pressure acting on a hydraulic chamber 8. A metal belt 9, formed by mounting a large number of metal elements on two metal ring assemblies, is wound around the drive pulley 5 and the driven pulley 7.

Provided on the left end of the drive shaft 1 is a forward/reverse travel switching mechanism 12 which is a single-pinion type planetary gear mechanism. Included in the switching mechanism 12 is a forward clutch 10 that is engaged when establishing a forward gear position and transmitting rotation of the drive shaft 1 to the drive pulley 5 in the same direction. Also included in the switching mechanism 12 is a reverse brake 11 that is engaged when establishing a reverse gear position and transmitting rotation of the drive shaft 1 to the drive pulley 5 in the reverse direction. A sun gear 27 of the forward/reverse travel switching mechanism 12 is fixed to the drive shaft 1. A planetary carrier 28 is restrained to a casing by the reverse brake 11. A ring gear 29 is coupled to the drive pulley 5 by the forward clutch 10.

A starting clutch 13 provided at the right end of the driven shaft 2 couples a first middle gear 14 that is relatively rotatably supported on the driven shaft 2 to the driven shaft 2. A second middle gear 16, which meshes with the first middle gear 14, is provided on a middle shaft 15 disposed in parallel to the driven shaft 2. A third middle gear 20 provided on the middle shaft 15 meshes with an input gear 19 provided on a gear box 18 of a differential gear 17. Side gears 25 and 26 provided at the respective extremities of a left axle 23 and a right axle 24 that are relatively rotatably supported on the gear box 18 mesh with a pair of pinions 22 provided on the gear box 18 via pinion shafts 21. Driven wheels W are connected to the extremities of the left axle 23 and the right axle 24.

When a forward direction is selected by a select lever, the forward clutch 10 is first engaged by a command from a hydraulic control unit U2 that is actuated by an electronic control unit U1, wherein the drive shaft 1 is integrally coupled to the drive pulley 5. Subsequently, the start clutch 13 is engaged; the torque of the engine E is transmitted to the driven wheels W via the drive shaft 1, the drive pulley 5, the metal belt 9, the driven pulley 7, the driven shaft 2, and the differential gear 17; and the vehicle starts traveling in the forward direction. When a reverse direction is selected by the select lever, the reverse brake 11 is first engaged by a command from the hydraulic control unit U2, and the drive pulley 5 is driven in a direction opposite the rotational direction of the drive shaft 1, so that the vehicle starts moving in the reverse direction due to the start clutch 13 being engaged.

When the vehicle is started in such a manner, the hydraulic pressure supplied to the hydraulic chamber 6 of the drive pulley 5 is increased by a command from the hydraulic control unit U2; the movable pulley half 5b of the drive pulley 5 approaches the fixed pulley half 5a to increase the effective radius; the hydraulic pressure supplied to the hydraulic chamber 8 of the driven pulley 7 decreases; the movable pulley half 7b of the driven pulley 7 moves away from the fixed pulley half 7a to decrease the effective radius; and the ratio of the belt type continuously variable transmission T continuously varies from a LOW ratio (the maximum ratio) to an OD ratio (the minimum ratio).

As shown in FIG. 2, the metal belt 9 is formed by supporting a large number of metal elements 32 on a pair of left and right metal ring assemblies 31. Each metal ring assembly 31 is formed by layering a plurality (12 in the illustrated embodiment) of metal rings 33. The metal element 32, which is formed by cutting metal sheet material, includes an element main body 34, a neck portion 36 positioned between a pair of left and right ring slots 35 with which the metal ring assemblies 31 engage, and an ear portion 37 having a substantially triangular shape connected to the radially outer side of the element main body 34 via the neck portion 36. A pair of pulley abutment faces 39, which abut V faces of the drive pulley 5 and the driven pulley 7, is formed at opposite ends in the left-and-right direction of the element main body 34. Furthermore, principal faces 40 are formed on the front and rear sides, in the direction of travel, of the metal element 32. The principal faces 40 contact each other, and an inclined face 42 is formed in a lower part of the principal face 40 on the front side, in the direction of travel, via a rocking edge 41 extending in the left-and-right direction. Furthermore, in order to join metal elements 32 that are adjacent in the fore-and-aft direction, projection/recess parts 43 are formed on front and rear faces of the ear portions 37, the projection/recess parts 43 being capable of interlocking with each other. Moreover, saddle faces 44 are formed at lower edges of the left-and-right ring slots 35 to support the inner peripheral faces of the metal ring assemblies 31.

FIG. 3 shows a state in which the vehicle is in a maximum speed traveling state (a TOP ratio state), and the effective radius of the drive pulley 5 is larger than the effective radius of the driven pulley 7. The thickness of the metal belt 9 in FIG. 3 schematically illustrates the magnitude of the tensile stress on each of the metal rings 33 due to the tension of the metal belt 9. As shown by the broken lines in FIGS. 4 and 5, in a chord section (region A) on a return side, where the metal belt 9 returns from the driven pulley 7 to the drive pulley 5, the stress has a constant value $\sigma T_{LOW}$, and in a chord section (region C) on an outward side, where the metal belt 9 is fed out from the drive pulley 5 to the driven pulley 7, the stress has a constant value $\sigma T_{HIGH}$. The stress $\sigma T_{LOW}$ in region A is smaller than the stress $\sigma T_{HIGH}$ in region C. In a section where the metal belt 9 is wound around the drive pulley 5 (region B), the stress increases from $\sigma T_{LOW}$ to $\sigma T_{HIGH}$ in a direction taken from the entrance side to the exit side. In a section where the metal belt 9 is wound around the driven pulley 7 (region D), the stress decreases from $\sigma T_{HIGH}$ to $\sigma T_{LOW}$ in a direction taken from the entrance side to the exit side.

The tensile stress of the metal ring 33, due to the tension of the metal belt 9, is constant in the thickness direction. That is, as shown by the broken lines in FIGS. 4 and 5, the tensile stress on the inner peripheral face and the tensile stress on the outer peripheral face of the metal ring 33 of the innermost layer are the same.

Figure 9C:
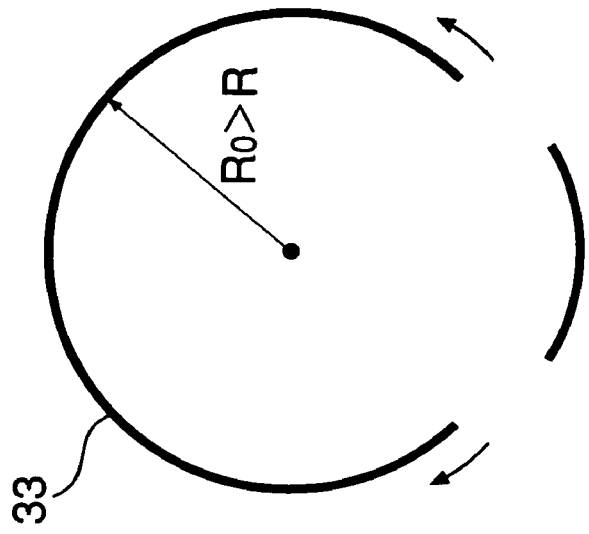
FIGS. 9A-C are diagrams explaining the definition of the free state radius of the metal ring.
Figure 9B:
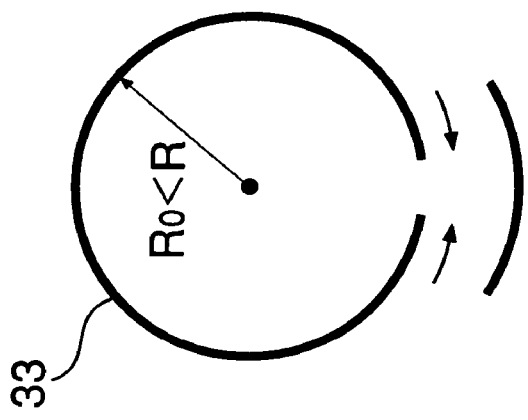
Figure 9A:
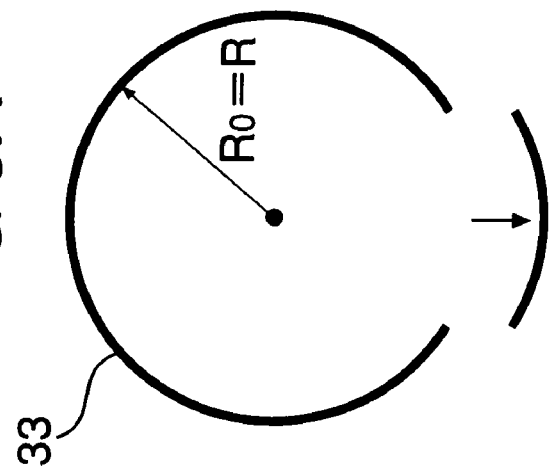

In addition to the tensile stress due to tension, the metal ring 33 experiences a tensile stress and a compressive stress due to the flexure of the metal ring 33. As shown in FIGS. 9A-C, the radius of the metal ring 33, when cut, is constant at Ro (free state radius), but the metal ring in a used state deforms into a shape having the region A to the region D. The radius of curvature, which is originally the free state radius Ro, increases to ∞ in the chord section (region A) on the return side and the chord section (region C) on the outward side. The radius of curvature changes from the free state radius Ro to $R_{DR}$ in region B (the large diameter side) where it is wound around the drive pulley 5. Also, the radius of curvature changes from the free state radius Ro to $R_{DN}$ in region D (the small diameter side) where it is wound around the driven pulley 7. The free state radius Ro of the metal ring 33 is imparted in a ring circumferential-length correction step.

In region A and region C, wherein the radius of curvature of the metal ring 33 increases as explained above, a tensile flexural stress $\sigma V_{ST}$ acts on the inner peripheral face of the metal ring 33, and a compressive flexural stress $\sigma V_{ST}$ acts on the outer peripheral face. On the other hand, in region B and region D, wherein the radius of curvature of the metal ring 33 decreases, a flexural stress $\sigma V_{DR}$ or $\sigma V_{DN}$ acts on the inner peripheral face of the metal ring 33, and a flexural stress $\sigma V_{DR}$ or $\sigma V_{DN}$ acts on the outer peripheral face.

The graphs of FIG. 4 and FIG. 5 also show changes in the flexural stress acting on the inner peripheral face and the outer peripheral face of the metal ring 33 when the vehicle is in the maximum speed traveling state explained by reference to FIG. 3. As shown in FIG. 4, in the inner peripheral face of the metal ring 33, the constant tensile flexural stress $\sigma V_{ST}$ acts on the two chord sections thereof (region A and region C), the flexural stress $\sigma V_{DR}$ acts on region B wherein the metal ring 33 is wound around the drive pulley 5 and the radius of curvature is larger, and the flexural stress $\sigma V_{DN}$ acts on region D wherein the metal ring 33 is wound around the driven pulley 7 and the radius of curvature is smaller. On the other hand, as shown in FIG. 5, in the outer peripheral face of the metal ring 33, the constant compressive flexural stress $\sigma V_{ST}$ acts on the two chord sections (region A and region C), the flexural stress $\sigma V_{DR}$ acts on region B wherein the metal ring 33 is wound around the drive pulley 5 and the radius of curvature is larger, and the flexural stress $\sigma V_{DN}$ acts on region D wherein the metal ring 33 is wound around the driven pulley 7 and the radius of curvature is smaller.

Furthermore, a compressive stress (contact stress) accompanying contact with the saddle face 44 of the metal element 32 acts on the inner peripheral face of the metal ring 33 of the innermost layer. In FIG. 4, a contact stress on the drive pulley 5 side is denoted by $\sigma C_{DR}$, and a contact stress on the driven pulley 7 side is denoted by $\sigma C_{DN}$. The contact stresses $\sigma C_{DR}$ and $\sigma C_{DN}$ are calculated by multiplying a tension of the metal ring 33 by a stress concentration factor (in general, on the order of 30 to 60) corresponding to the radius of curvature of the edge of the saddle face 44 of the metal element 32. The relationship between the stress concentration factor and the radius of curvature of the edge of the saddle face 44 is shown in FIG. 7.

FIG. 4 shows a stress on the inner peripheral face of the metal ring 33 of the innermost layer. The stress on the inner peripheral face of the metal rings 33, other than the innermost layer, does not include the contact stresses $\sigma C_{DR}$ and $\sigma C_{DN}$. This is because the inner peripheral face of the metal rings 33, other than the innermost layer, does not contact the saddle face 44 of the metal element 32. Furthermore, FIG. 5 shows a stress on the outer peripheral face of the metal ring 33 of the innermost layer. The stress on the outer peripheral face of the metal rings 33, other than the innermost layer, is the same as in FIG. 5.

A residual compressive stress is imparted onto the surface of the metal ring 33 as a result of a nitriding treatment carried out to enhance the abrasion resistance thereof. The residual stress imparted by the nitriding treatment has the same sign on the inner peripheral face and the outer peripheral face (compressive stress only).

The solid line of FIG. 4 represents the sum of the stress $\sigma T_{LOW}$ or $\sigma T_{HIGH}$ acting due to the tension of the metal ring 33, the stress $\sigma V_{DR}$ or $\sigma V_{DN}$ acting on the inner peripheral face of the metal ring 33 due to the flexure of the metal ring 33, and the contact stress $\sigma C_{DR}$ or $\sigma C_{DN}$ acting due to the contact with the saddle face 44, thus showing changes in the total stress acting on the inner peripheral face of the metal ring 33. Furthermore, the solid line of FIG. 5 represents the sum of the stress $\sigma T_{LOW}$ or $\sigma T_{HIGH}$ acting due to the tension of the metal ring 33 and the stress $\sigma V_{DR}$ or $\sigma V_{DN}$ acting on the outer peripheral face of the metal ring 33 due to the flexure of the metal ring 33, thus showing changes in the total stress acting on the outer peripheral face of the metal ring 33.

In FIG. 4, a stress amplitude $\sigma_{ai}$ on the inner peripheral face of the metal ring 33 is defined as half of the difference between the maximum tensile stress and the maximum compressive stress. A stress center $\sigma_{mi}$ on the inner peripheral face of the metal ring 33 is defined as a stress at the center of the stress amplitude $\sigma_{ai}$. Similarly, in FIG. 5, a stress amplitude $\sigma_{ao}$ on the outer peripheral face of the metal ring 33 is defined as half of the difference between the maximum tensile stress and the maximum compressive stress. A stress center $\sigma_{mo}$ on the outer peripheral face of the metal ring 33 is defined as a stress at the center of the stress amplitude $\sigma_{ao}$.

In FIG. 8, the stress center σm on the innermost layer ring surface is plotted as the abscissa and the stress amplitude σa on the innermost layer ring surface is plotted as the ordinate. Equal life lines L1 and L2, which slope down to the right, show a combination of the stress center σm and the stress amplitude σa that gives an equal fatigue life of the metal ring 33. The smaller the stress center σm and the stress amplitude σa, that is, the closer the equal life lines L1 and L2 are to the point of origin, the longer the fatigue life of the metal ring 33.

On the inner peripheral face of the metal ring 33 of the innermost layer shown in FIG. 4, the equal life line L1, on which, at point A, lie the stress center $\sigma_{mi}$ and the stress amplitude $\sigma_{ai}$, shows that the metal ring 33 breaks when repeatedly bent $1.5\times10^7$ times. On the other hand, on the outer peripheral face of the metal ring 33 of the innermost layer shown in FIG. 5, the equal life line L2, on which, at point B, lie the stress center $\sigma_{mo}$ and the stress amplitude $\sigma_{ao}$, shows that the metal ring 33 breaks when repeatedly bent $5\times10^7$ times. That is, the durability of the inner peripheral face of the metal ring 33 is less than one-third of the durability of the outer peripheral face, and the metal ring 33 of the innermost layer breaks from the inner peripheral face due to fatigue.

Line L3 shows an elastic limit line specific to the material of the metal ring 33, and the metal ring 33 plastically deforms in a region outside line L3 (upper right-hand side) due to a large stress amplitude $\sigma_{ai}$ or $\sigma_{ao}$. Line L4 shows a compressive side elastic limit line of the metal ring 33, and the metal ring 33 plastically deforms in a region outside line L4 (upper left-hand side) where the compressive stress exceeds the elastic limit. Line L4 is determined by adding a residual compressive stress $\Delta\sigma$ due to a thermal treatment to an elastic limit L4' of a base material.

As shown in FIG. 9A, if there is no residual stress acting on the metal ring 33 due to there being a difference in circumferential length wherein the metal ring 33 has a radius R in an endless state, a free state radius Ro of the metal ring 33 in a state in which a part thereof is cut out, that is, in a state in which the residual stress is released, is equal to the endless state radius R. On the other hand, as shown in FIG. 9B, if the residual stress of the metal ring 33 in the endless state is a compressive stress on the outer peripheral face and a tensile stress on the inner peripheral face, when part of the metal ring 33 is cut out, the outer peripheral face of the metal ring 33 stretches, and the inner peripheral face thereof compresses, wherein the metal ring 33 deforms to close and the free state radius Ro becomes smaller than the endless state radius R. On the other hand, as shown in FIG. 9C, if the residual stress of the metal ring 33 in the endless state is a tensile stress on the outer peripheral face and a compressive stress on the inner peripheral face, when part of the metal ring 33 is cut out, the outer peripheral face of the metal ring 33 compresses, and the inner peripheral face thereof stretches, wherein the metal ring 33 deforms to an open state and the free state radius Ro becomes larger than the endless state radius R.

In this way, any free state radius Ro can be imparted by a circumferential-length correction that involves stretching either the outer peripheral face or the inner peripheral face of the metal ring 33.

The characteristics of the change in total stress on the metal ring 33, shown by the solid lines in FIG. 4 and FIG. 5, move in parallel in the up-and-down direction accompanying changes in the flexural stress due to circumferential-length correction (free state radius Ro). Therefore, the stress amplitudes $\sigma_{ai}$ and $\sigma_{ao}$ of the metal ring 33 do not change as a result of the circumferential-length correction, but the stress centers $\sigma_{mi}$ and $\sigma_{mo}$ do change with such a correction.

Since the stress centers $\sigma_{mi}$ and $\sigma_{mo}$ are changed by adjusting the free state radius Ro of the metal ring 33 to change the flexural stress, among the stress center $\sigma_{mi}$ and the stress amplitude $\sigma_{ai}$ of the metal ring 33 of the innermost layer, which are at point A on the equal life line L1 in FIG. 8, the stress center $\sigma_{mi}$ is moved in the direction shown by the arrow. That is, by increasing the free state radius Ro of the metal ring 33, the point at which the stress center $\sigma_{mi}$ and the stress amplitude $\sigma_{ai}$ merge moves from point A on the equal life line L1 to a point A' on the equal life line L2, thus increasing the fatigue strength of the inner peripheral face of the metal ring 33.

However, the stress center $\sigma_{mi}$ cannot be moved in the direction shown by the arrow without limitation, and the compressive side elastic limit line L4 (for example, compressive stress=−700 MPa) becomes a limit. This is because, when passing the compressive side elastic limit line L4 from right to left, the compressive stress on the inner peripheral face of the metal ring 33 of the innermost layer becomes excessive and the metal ring 33 plastically deforms and breaks. The position of the compressive side elastic limit line L4 is determined by the characteristics of a nitriding treatment of the metal ring 33, that is, the residual compressive stress imparted to the metal ring 33 by the nitriding treatment.

FIG. 10 is a graph illustrating a region, as represented by the hatching, in which the durability of the metal ring 33 of the innermost layer is enhanced, wherein the abscissa denotes an inter-shaft distance d (mm), and the ordinate denotes a free state radius Ro (mm). Line L5 passes through an inner periphery free state radii of b170:280 mm (see FIG. 12) and b143:147 mm (see FIG. 13), wherein the residual compressive stress due to thermal treatment is −1300 MPa, and the maximum compressive stress is 700 MPa. Line L6 passes through inner periphery free state radius of a170:52 mm (see FIG. 12) and b143:43 mm (see FIG. 13), wherein the maximum compressive stress is 700 MPa.

Within the hatched area in FIG. 10, that is, during the state wherein both $Ro<4.93d-557.4$ and $Ro>0.33d-4.7$ apply, and the residual compressive stress x (MPa) due to thermal treatment is, $-1300 \leq x < 1000$ then the total compressive stress does not exceed 2000 MPa and is within the elastic deformation limit, a minimum abrasion resistance necessary for the metal ring 33 is guaranteed, and it is possible to effectively guarantee the life of the metal ring 33.

FIG. 11 is a graph illustrating a region, as represented by the hatching, in which the durability of the metal ring 33 of the innermost layer is enhanced, wherein the abscissa denotes residual compressive stress due to nitriding treatment, and the ordinate denotes the free state radius Ro of the metal ring 33 nondimensionalized by a minimum winding radius (a minimum radius when the metal ring 33 is wound around the drive pulley 5 or the driven pulley 7). Boundaries S1 and S2 define a portion of the region corresponding to wherein the stress center $\sigma_{ai}$ and the stress amplitude $\sigma_{ma}$ of the metal ring 33 of the innermost layer do not exceed the compressive side elastic limit line L4 (see FIG. 8), and boundary S3 corresponds to an extent of the nitriding treatment necessary for guaranteeing the abrasion resistance of the metal ring 33, which is equivalent to −1300 MPa expressed as the residual compressive stress of the metal ring 33.

When the ordinate y of FIG. 11 denotes the ratio of the free state radius to the minimum winding radius of the metal ring 33, and the abscissa x denotes the residual compressive stress x (MPa) of the metal ring 33 due to the thermal treatment, the boundary S1 is expressed as:

$y=0.000026x^2+0.084x+70.5$, the boundary S2 is expressed as:

$y=0.000003x^2+0.007x+5.0$, and the boundary S3 is expressed as x=−1300, a boundary S4 is expressed as x=−1000, a boundary S5 is expressed as y=1.5, and a boundary S6 is expressed as y=5.0.

Therefore, by setting the nondimensionalized free state radius Ro and the residual compressive stress due to the nitriding treatment of the metal ring 33 of the innermost layer within the optimum region surrounded by the boundaries S1 to S3 of FIG. 11, the stress of the metal ring 33 is prevented from exceeding the compressive side elastic limit line L4; sufficient abrasion resistance for the metal ring 33 is guaranteed; and the durability of the metal ring 33 against repetitive flexure, while taking into consideration the contact stress with the saddle face 44 of the metal element 32, is maximized.

The conditions defined by the boundary S3 (residual compressive stress x=−1300 MPa) are satisfied by coating the saddle face 44 of the metal element 33, decreasing the hardness of the saddle face 44, or increasing the oil retention of the saddle face 44. As such, the boundary S3 is extended to the boundary S4 (residual compressive stress x=−1000 MPa). However, in a region defined by the boundaries S3 and S4, the nondimensionalized free state radius Ro is limited to a range of y=1.5 (the boundary S5) to y=5.0 (the boundary S6). The meaning of the free state radius Ro of the metal ring 33 being limited by the boundaries S5 and S6 is explained below.

Figure 12:
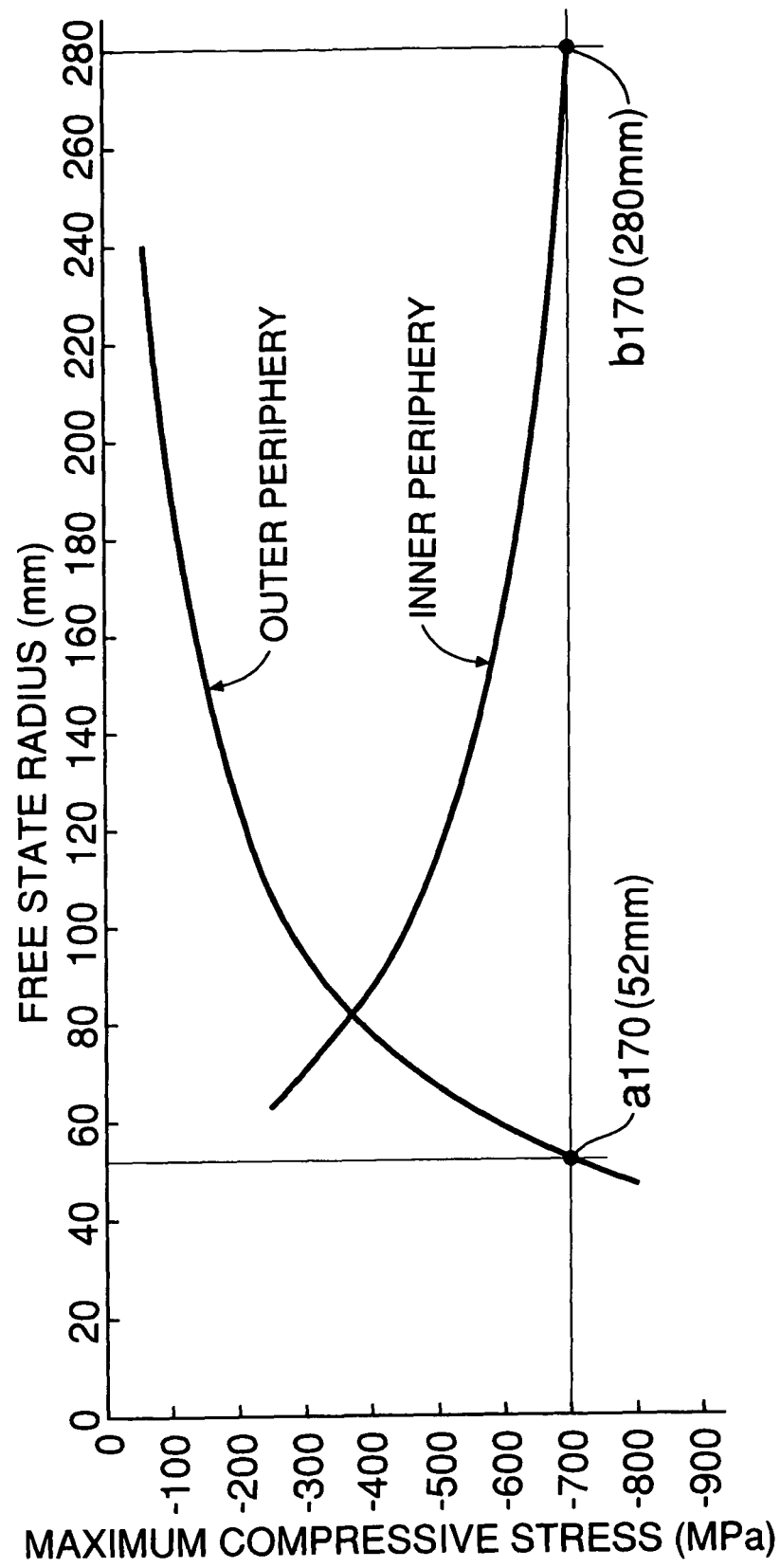
FIG. 12 is a graph illustrating the relationship between the maximum compressive stress and the free state radius of the metal ring, formed by plotting the maximum compressive stress of FIGS. 4 and 5 relative to the free state radius (in the case of an inter-shaft distance of 170 mm)
Figure 13:
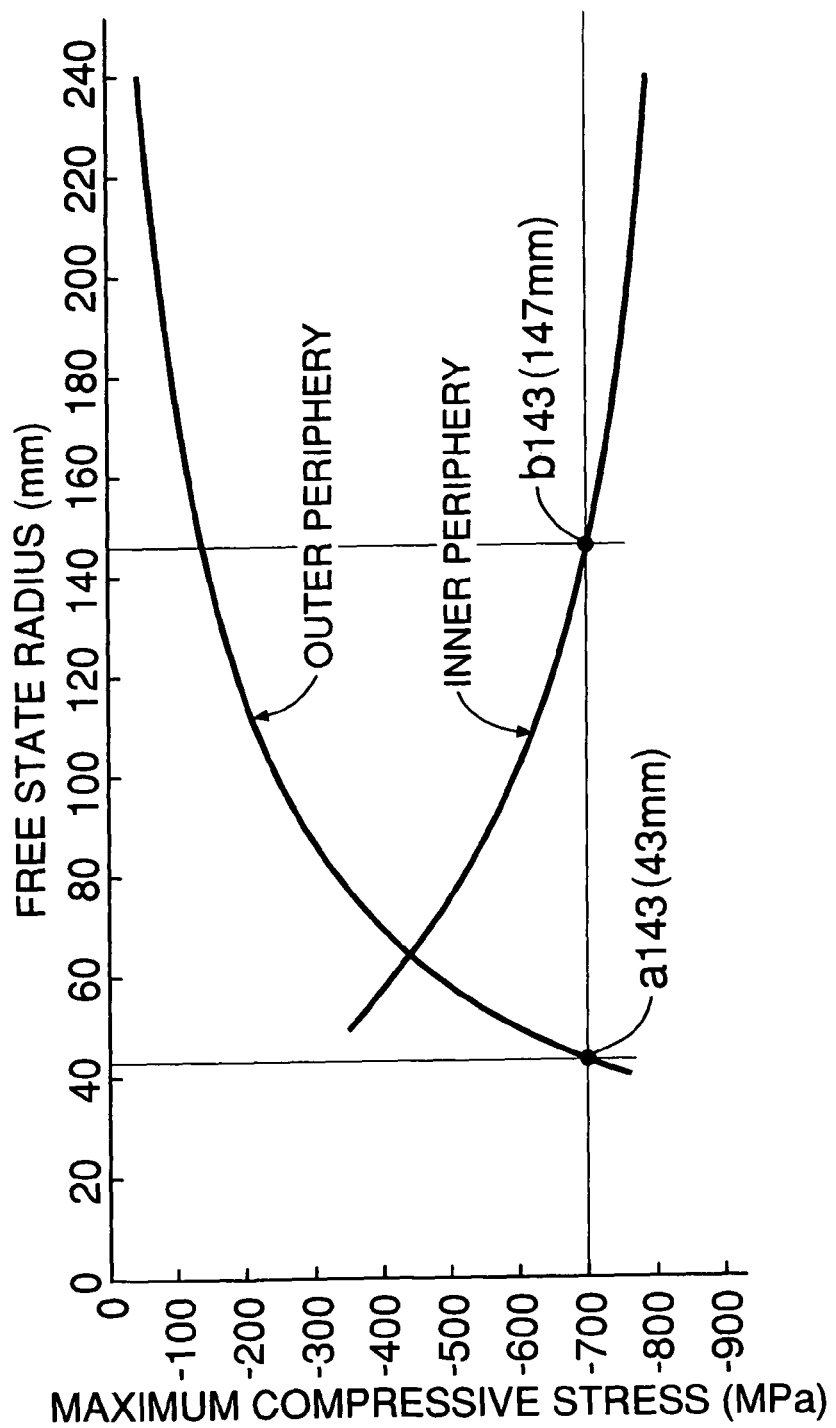
FIG. 13 is a graph illustrating the relationship between the maximum compressive stress and the free state radius of the metal ring, formed by plotting the maximum compressive stress of FIGS. 4 and 5 relative to the free state radius (in the case of an inter-shaft distance of 143 mm)

FIG. 12 and FIG. 13 are graphs showing the relationship between the maximum compressive stress and the free state radius Ro of the metal ring 33 in a TOP ratio state, and correspond to inter-shaft distances (distance between the drive shaft 1 and the driven shaft 2) of 170 mm and 143 mm, respectively. When the free state radius Ro increases, the absolute value of the maximum compressive stress on the inner peripheral side of the metal ring 33 increases, and when the free state radius Ro decreases, the absolute value of the maximum compressive stress on the outer peripheral side of the metal ring 33 increases.

When the residual compressive stress due to the thermal treatment is −1300 MPa, it is necessary for the maximum compressive stress of FIG. 12 and FIG. 13 to be greater than −700 MPa (in order to make the total greater than 2000 MPa). That is, it is necessary for the free state radius Ro to be between a170 (52 mm) and b170 (280 mm) in FIG. 12, and between a143 (43 mm) and b143 (147 mm) in FIG. 13. When the minimum winding radius for the inter-shaft distance of 170 mm is denoted by r170 and the minimum winding radius for the inter-shaft distance of 143 mm is denoted by r143, a170/r170=1.3, b170/r170=9.2, a143/r143=1.5, and b143/r143=5.0.

Therefore, if y is set in the range of 1.5 (the boundary S5) to 5.0 (the boundary S6) for the inter-shaft distance of 143 mm, high abrasion resistance and durability against repetitive flexure are imparted to the metal ring 33 in a practical range (inter-shaft distance of 143 mm to 170 mm). Also, a preferred range when the absolute value of the residual compressive stress is greater than 1300 MPa is a range defined by the boundary S1 and the boundary S2. The boundaries S1', S2', S5', and S6' in FIG. 11 correspond to the boundaries S1, S2, S5, and S6 when the inter-shaft distance is 170 mm. Furthermore, the absolute value of the residual compressive stress is less than 1300 MPa, S2≈S5 from the curvatures of the outer periphery in FIG. 12 and FIG. 13. Since an extension line of the boundary S1 increases as the absolute value of the residual compressive stress decreases, there is a possibility that a value of y relative to x in FIG. 11 might be misread. Therefore, in this range, y is set on the boundary S6.

By setting an appropriate free state radius Ro for the metal ring 33 within the hatched region of FIG. 11 using the residual compressive stress imparted to the metal ring 33 by the nitriding treatment, that is, by setting a free state radius Ro, while taking into consideration the contact stress acting on the metal ring 33 of the innermost layer from the saddle face 44 of the metal element 32 or the elastic deformation limit of the metal ring 33, it is possible to effectively extend the fatigue life of the metal ring 33 and suppress the sum of the compressive stress and the residual compressive stress acting on the metal ring 33 during operation so that it is no greater than an elastic deformation limit stress (for example, 2000 MPa) of the material, thereby reliably preventing the metal ring 33 from breaking.

The circumferential-length correction step for setting the free state radius Ro of the metal ring 33 includes a solutionizing treatment which is a preliminary step, and an age-hardening treatment which is a subsequent step. When the age-hardening treatment is carried out, if the shape of the metal ring 33 is distorted, the free state radius Ro is affected. Therefore, it is necessary to carry out the age-hardening treatment while maintaining the metal ring 33 in a perfect circle state as shown in FIG. 14A.

Although a large space is necessary to maintain a large number of metal rings 33 in a perfect circle state, the age-hardening treatment can be carried out for the metal rings in a confined space while avoiding mutual interference therebetween. For example, if twelve metal rings 33 form the metal ring assembly 31 and are numbered #1 to #12 from the inner periphery side to the outer periphery side, a set is made from every third ring, e.g., #1, #4, #7, and #10, as shown in FIG. 14B, and these metal ring assembly sets are concentrically arranged sequentially from #1 having the smallest radius to #10 having the largest radius. The age-hardening treatment can be carried out in the same way by making a set from the four rings numbered #2, #5, #8 and #11 and another set from the four rings numbered #3, #6, #9, and #12. Instead of making a set from every third metal ring 33, a set may be formed from every second or every fourth metal ring 33.

Figure 15A:
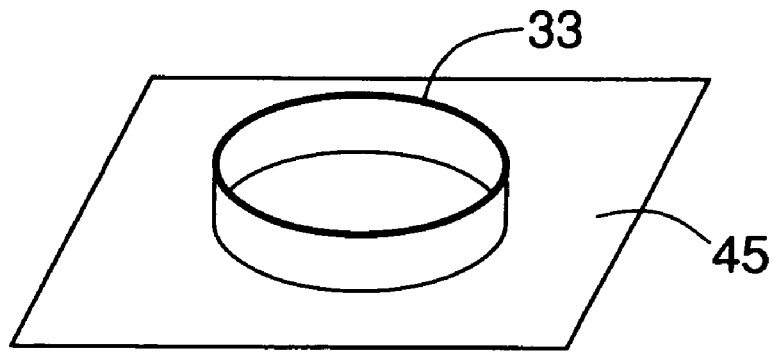
FIGS. 15A-C are diagrams illustrating retainer fittings used when nitriding the metal ring.
Figure 15B:
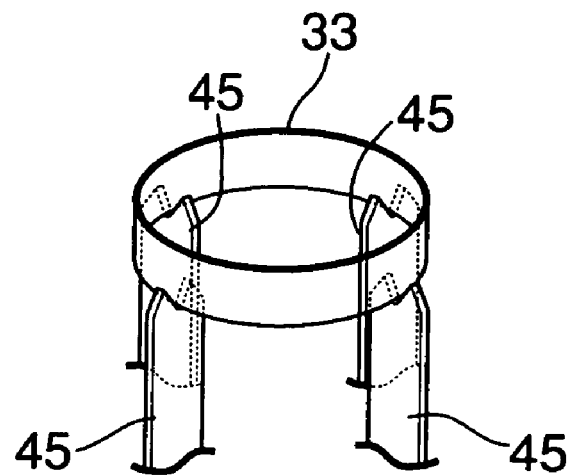
Figure 15C:
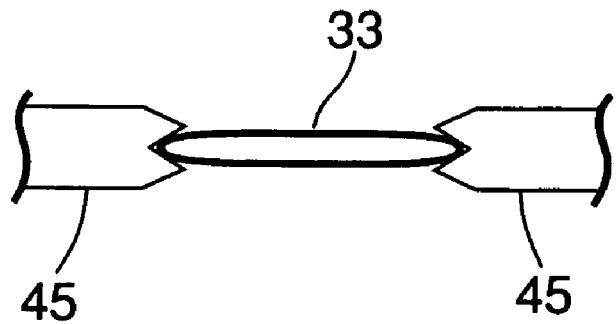

On the other hand, in the nitriding treatment step, which is carried out after the circumferential-length correction step is completed, shape retention of the metal ring 33 does not affect the free state radius Ro. Therefore, the nitriding treatment is carried out by squashing the metal ring 33 into an elliptical shape as shown in FIG. 14C. In this way, by making the metal ring 33 into an elliptical shape, the required space is reduced as compared with the case where the metal ring 33 is made into a perfect circle. Furthermore, as shown in FIGS. 15A to 15C, if retainer fittings 45 for the nitriding treatment are selected to have a small contact area with an end portion of the metal ring 33, the influence of the retainer fittings 45 can be more completely eliminated.

Although an embodiment of the present invention is explained above, the present invention is not limited thereto and can be modified in a variety of ways without departing from the spirit and scope of the present invention described in the claims.

The invention claimed is:

1. A metal ring of a metal belt used in a belt type continuously variable transmission,
   wherein the metal ring is an innermost ring of a plurality of metal rings which are laminated one on another, and
   wherein the innermost metal ring comprises:
      a base material;
      a free state radius that is set wherein a stress center of an inner peripheral face of the innermost metal ring has a value that does not exceed a compressive elastic deformation limit of the inner peripheral face of the innermost metal ring; and
      a residual compressive stress due to a thermal treatment;
      wherein the compressive elastic deformation limit equals the residual compressive stress added to a compressive elastic deformation limit of the base material;
      wherein the stress center is determined from a variation in stress of the inner peripheral face of the innermost metal ring during operation of the continuously variable transmission as well as a compressive contact stress which occurs when the inner peripheral face of the innermost metal ring contacts a saddle face of a metal element carrying the metal ring therein; and
      wherein x (MPa) denotes the residual compressive stress of the metal ring due to a thermal treatment, d denotes an inter-shaft distance in millimeters, and Ro denotes the free state radius in millimeters, wherein the following expressions are simultaneously valid:

$$-1300 \leq x < -1000$$

$$Ro < 4.93d - 557.4, \text{ and}$$

$$Ro > 0.33d - 4.7.$$

2. The metal ring according to claim 1, wherein setting of the free state radius of the metal ring is carried out by correcting a circumferential length of the metal ring; an age-hardening treatment is carried out in a perfect circle state after the circumferential length has been corrected; and a nitriding treatment is carried out in an elliptical state after the age-hardening treatment has been carried out.

3. The metal ring according to claim 2, wherein the age-hardening treatment is carried out while concentrically arranging a plurality of the metal rings that are not in contact with each other when in use.

4. The metal ring according to claim 2, wherein the circumferential-length correction of the free state radius increases a fatigue strength of the inner peripheral face by moving the stress center toward a compressive side elastic limit obtained by adding a residual compressive stress due to a thermal treatment to the compressive elastic deformation limit of the base material.

5. The metal ring of claim 4, wherein the maximum amplitude of the compressive stress includes a contact stress which occurs when the metal ring contacts a saddle face of a metal element carrying the metal ring therein.

6. A metal ring of a metal belt used in a belt type continuously variable transmission,
   wherein the metal ring is an innermost ring of a plurality of metal rings which are laminated one on another,
   wherein the innermost metal ring comprises:
   a base material;
   a free state radius that is set wherein a stress center ($\sigma_{mi}$) of an inner peripheral face of the innermost metal ring has a value that does not exceed a compressive elastic deformation limit of the inner peripheral face of the innermost metal ring; and
   a residual compressive stress due to a thermal treatment;
      wherein the compressive elastic deformation limit equals the residual compressive stress added to a compressive elastic deformation limit of the base material;
      wherein the stress center is determined from a variation in stress of the inner peripheral face of the innermost metal ring during operation of the continuously variable transmission as well as a compressive contact stress which occurs when the inner peripheral face of the innermost metal ring contacts a saddle face of a metal element carrying the metal ring therein, and
   wherein y denotes the free state radius/minimum winding radius of the metal ring and x (MPa) denotes the residual compressive stress of the metal ring due to a thermal treatment, wherein the following expressions are simultaneously valid:

$x<-1300$ $y<0.000026x^2+0.084x+70.5$, and $y>0.000003x^2+0.007x+5.0$ or $y<5.0$ $y>1.5$, and $-1300 \leq x < -1000$.

7. The metal ring according to claim 6, wherein setting of the free state radius of the metal ring is carried out by correcting a circumferential length of the metal ring; an age-hardening treatment is carried out in a perfect circle state after the circumferential length has been corrected; and a nitriding treatment is carried out in an elliptical state after the age-hardening treatment has been carried out.

8. The metal ring according to claim 7, wherein the age-hardening treatment is carried out while concentrically arranging a plurality of the metal rings that are not in contact with each other when in use.

* * * * *